United States Patent
Morimura

(10) Patent No.: US 11,634,068 B2
(45) Date of Patent: *Apr. 25, 2023

(54) DISPLAY DEVICE AND DISPLAY METHOD FOR DISPLAY DEVICE

(71) Applicant: TOYOTA JIDOSHA KABUSHIKI KAISHA, Toyota (JP)

(72) Inventor: Junichi Morimura, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/460,792

(22) Filed: Aug. 30, 2021

(65) Prior Publication Data

US 2021/0387569 A1    Dec. 16, 2021

Related U.S. Application Data

(63) Continuation of application No. 16/990,297, filed on Aug. 11, 2020, now Pat. No. 11,135,969.

(30) Foreign Application Priority Data

Oct. 16, 2019 (JP) .............................. JP2019-189435

(51) Int. Cl.
*B60Q 1/50* (2006.01)

(52) U.S. Cl.
CPC ...................... *B60Q 1/50* (2013.01)

(58) Field of Classification Search
CPC ........... B60Q 1/50; B60Q 1/503; B60Q 1/506
(Continued)

(56) References Cited

U.S. PATENT DOCUMENTS

| 7,808,376 B2 * | 10/2010 | Terzian | B60Q 1/302 340/471 |
| 8,390,475 B2 * | 3/2013 | Feroldi | G09F 21/04 340/471 |

(Continued)

FOREIGN PATENT DOCUMENTS

| JP | 2018-024291 A | 2/2018 |
| JP | 2020-059389 A | 4/2020 |
| WO | 2019/156106 A1 | 8/2019 |

OTHER PUBLICATIONS

Non-Final Office Action dated Oct. 27, 2022 to U.S. Appl. No. 17/487,329, filed Sep. 28, 2021.

(Continued)

*Primary Examiner* — Qutbuddin Ghulamali
(74) *Attorney, Agent, or Firm* — Dinsmore & Shohl LLP

(57) ABSTRACT

A display device provided in a vehicle that travels autonomously includes: a display unit configured to display information to an outside of the vehicle; a determination unit configured to determine whether a travel state of the vehicle is any one of a deceleration state, a stop state, and a start state, based on a detection result of an internal sensor of the vehicle; and a display control unit configured to display on the display unit the information corresponding to each of the deceleration state, the stop state, and the start state, based on a determination result of the determination unit. In response to the determination unit having determined that the vehicle is in the deceleration state, the display control unit is configured to display on the display unit the information including a display moving from an upper side to a lower side along a vertical direction of the vehicle.

4 Claims, 10 Drawing Sheets

(58) Field of Classification Search
USPC .......................................................... 340/464
See application file for complete search history.

(56) References Cited

U.S. PATENT DOCUMENTS

| | | | |
|---|---|---|---|
| 9,196,164 B1* | 11/2015 | Urmson | B60Q 1/50 |
| 10,300,911 B2* | 5/2019 | Shioe | B60W 10/20 |
| 10,688,920 B1 | 6/2020 | Neubauer | |
| 10,857,939 B2 | 12/2020 | Morimura | |
| 10,864,852 B2 | 12/2020 | Morikawa et al. | |
| 10,988,129 B2 | 4/2021 | Morikawa et al. | |
| 11,001,198 B2 | 5/2021 | Morimura et al. | |
| 11,040,658 B2 | 6/2021 | Yasue et al. | |
| 11,104,355 B2 | 8/2021 | Matsunaga et al. | |
| 11,124,203 B2 | 9/2021 | Urano et al. | |
| 11,163,372 B2 | 11/2021 | McFarland, Jr. | |
| 11,260,789 B2 | 3/2022 | Morimura et al. | |
| 11,260,860 B2 | 3/2022 | Hosokawa et al. | |
| 11,279,353 B2 | 3/2022 | Ikeda et al. | |
| 11,295,429 B2 | 4/2022 | Yokota et al. | |
| 11,302,193 B2 | 4/2022 | Mizuno et al. | |
| 11,312,300 B1 | 4/2022 | Ganlath et al. | |
| 11,328,605 B2 | 5/2022 | Wang et al. | |
| 11,332,161 B2 | 5/2022 | Murakami et al. | |
| 11,342,784 B2 | 5/2022 | Hsieh et al. | |
| 11,356,536 B2 | 6/2022 | Heiser et al. | |
| 11,358,594 B2 | 6/2022 | Fujii | |
| 11,364,842 B2 | 6/2022 | Morimura | |
| 11,383,729 B2 | 7/2022 | Sakai et al. | |
| 11,396,310 B2 | 7/2022 | Ito et al. | |
| 11,407,400 B2 | 8/2022 | Hawley | |
| 11,407,415 B2 | 8/2022 | Austin et al. | |
| 11,414,102 B2 | 8/2022 | Domeyer et al. | |
| 11,433,888 B2 | 9/2022 | Ito et al. | |
| 11,440,538 B2 | 9/2022 | Matsunaga et al. | |
| 11,447,154 B2 | 9/2022 | Tarao et al. | |
| 2018/0158339 A1 | 6/2018 | Kabe | |
| 2018/0192058 A1 | 7/2018 | Chen et al. | |
| 2018/0354365 A1* | 12/2018 | Tauchi | G09G 5/003 |
| 2019/0001818 A1* | 1/2019 | Sakata | B60Q 1/503 |
| 2021/0043013 A1 | 2/2021 | Tatara | |

OTHER PUBLICATIONS

Non-Final Office Action dated Sep. 23, 2022 to U.S. Appl. No. 17/473,187, filed Sep. 13, 2021.

Notice of Allowance dated Jan. 19, 2023 to U.S. Appl. No. 17/473,187, filed Sep. 13, 2021.

Notice of Allowance dated Feb. 7, 2023 to U.S. Appl. No. 17/487,329, filed Sep. 28, 2021.

Notice of Allowance dated Mar. 9, 2023 to U.S. Appl. No. 17/487,329, filed Sep. 28, 2021.

* cited by examiner

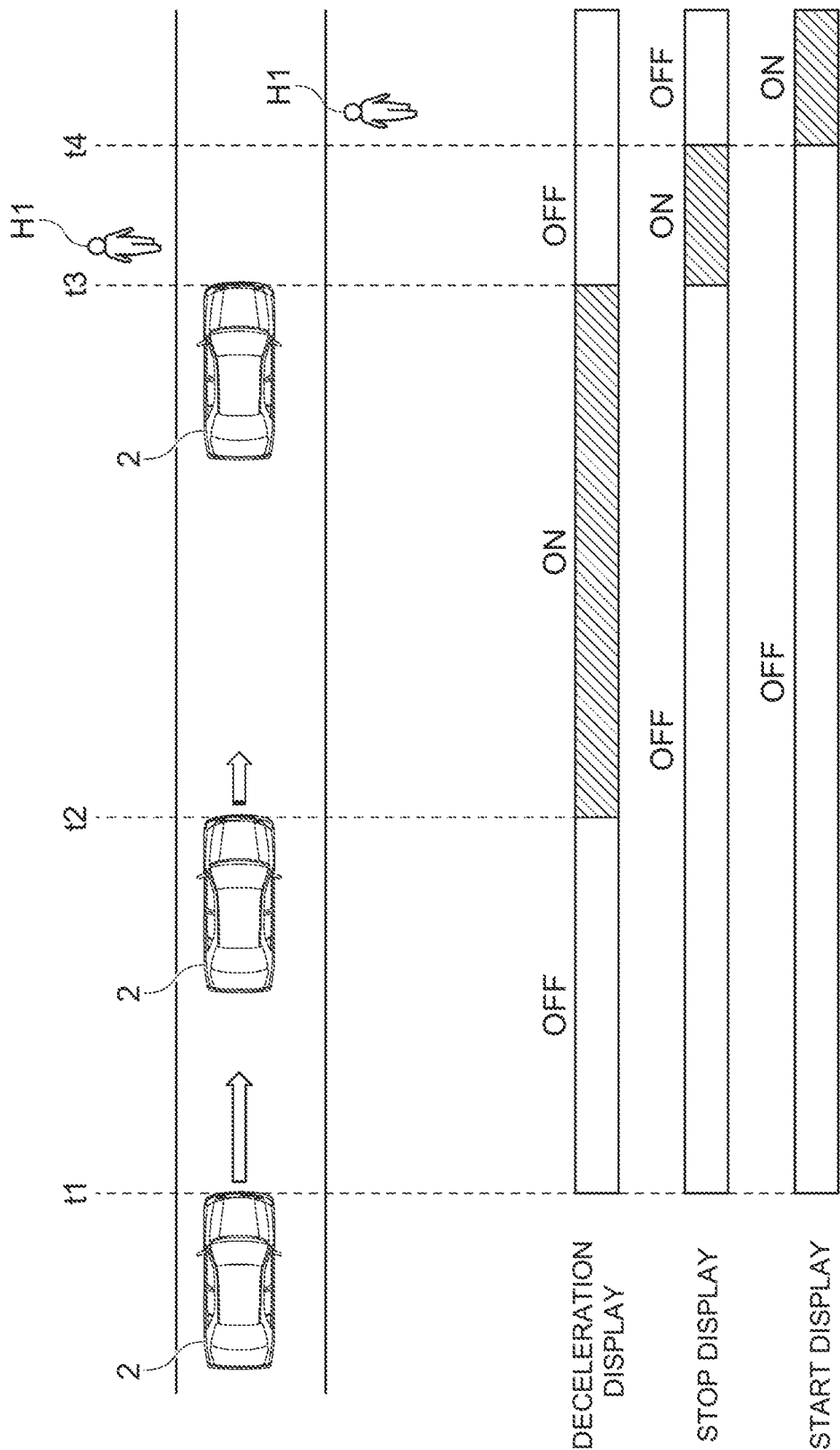

FIG. 5

| STATE<br>EXPRESSION | DECELERATION | STOP | START |
|---|---|---|---|
| VERTICAL EXPRESSION | EXPRESSION OF FLOWING FROM UPPER SIDE TO LOWER SIDE | STAGNATION EXPRESSION (EXPRESSION OF LOW-PERIOD UP AND DOWN OPERATION) | EXPRESSION OF FLOWING FROM LOWER SIDE TO UPPER SIDE |
| HORIZONTAL EXPRESSION | EXPRESSION OF FLOWING FROM OUTSIDE TO INSIDE | STAGNATION EXPRESSION (EXPRESSION OF LOW-PERIOD HORIZONTAL OPERATION) | EXPRESSION OF FLOWING FROM INSIDE TO OUTSIDE |
| FRONT-REAR EXPRESSION | EXPRESSION OF FLOWING FROM FRONT SIDE TO REAR SIDE | STAGNATION EXPRESSION (EXPRESSION OF LOW-PERIOD FRONT-REAR OPERATION) | EXPRESSION OF FLOWING FROM REAR SIDE TO FRONT SIDE |
| AREA CHANGE | CONVERGING CHANGE (CHANGE TO NARROWER AREA) | STAGNATION EXPRESSION (EXPRESSION OF LOW-PERIOD REPETITION OF CONVERGENCE AND DIVERGENCE) | DIVERGING CHANGE (CHANGE TO WIDER AREA) |
| USAGE OF COLOR | ORANGE | GREEN | WHITE |
| SPEED | FLASHING OF FIRST PERIOD (LONG PERIOD) | LIGHTING | FLASHING OF SECOND PERIOD (SHORT PERIOD) |
| TONE OF LIGHT (LUMINANCE) | MIDDLE | SMALL | LARGE |

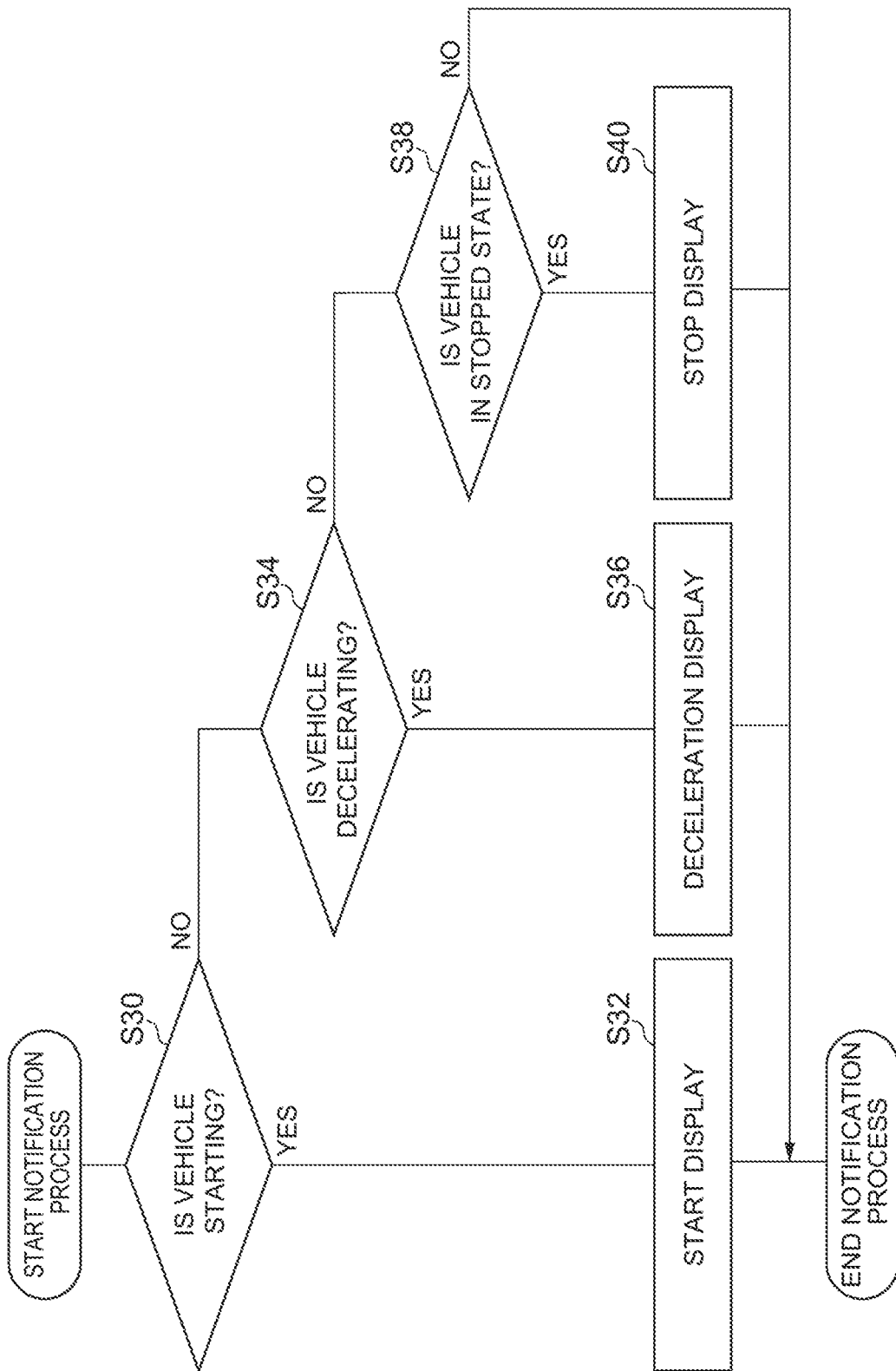

DISPLAY DEVICE AND DISPLAY METHOD FOR DISPLAY DEVICE

CROSS-REFERENCE TO RELATED APPLICATIONS

This application is a continuation application of U.S. patent application Ser. No. 16/990,297 filed Aug. 11, 2020, which claims priority to Japanese Patent Application No. 2019-189435 filed on Oct. 16, 2019, which are incorporated herein by reference in its entirety including the specification, drawings and abstract.

BACKGROUND

1. Technical Field

The present disclosure relates to a display device and display method for a display device.

2. Description of Related Art

U.S. Pat. No. 9,196,164 discloses a vehicle that travels autonomously. The vehicle includes a display unit that displays information to the outside of the vehicle. The display unit displays a stop road sign to notify that pedestrians are not permitted to pass before the vehicle. The display unit displays a message indicating that it is safe to cross in written and graphic form to notify pedestrians that it is safe to cross in front of the vehicle.

SUMMARY

In the device disclosed in U.S. Pat. No. 9,196,164, pedestrians or the drivers of other vehicles (hereinafter referred to as others) may have difficulty in recognizing the intentions of the vehicle. For example, when the vehicle presents the stop road sign, the others may be confused whether the sign notifies that they need to stop or notifies that the vehicle will stop. Furthermore, since road signs and writing are country or area specific, the others may be unable to understand the intentions of the road signs or writing that they recognized.

The present disclosure provides a display device that allows smooth communication with others.

A first aspect of the present disclosure is a display device provided in a vehicle that travels autonomously. The display device includes a display unit, a determination unit, and a display control unit. The display unit is configured to display information to the outside of the vehicle. The determination unit is configured to determine whether a travel state of the vehicle is any one of a deceleration state, a stop state, and a start state, based on the detection result of an internal sensor of the vehicle. The display control unit is configured to display on the display unit the information corresponding to each of the deceleration state, the stop state, and the start state, based on the determination result of the determination unit. In response to the determination unit having determined that the vehicle is in the deceleration state, the display control unit is configured to display on the display unit the information including optical presentation moving from an upper side to a lower side along a vertical direction of the vehicle.

In the display device, whether the travel state of the vehicle is in any one of a deceleration state, a stop state, and a start state is determined by the determination unit. Based on the determination result of the determination unit, the information corresponding to each of the deceleration state, the stop state, and the start state is displayed on the display unit by the display control unit. Thus, the display device can display the state of the vehicle to the outside of the vehicle. Then, in response to the determination unit having determined that the vehicle is in the deceleration state, the information including optical presentation moving from an upper side to a lower side along a vertical direction of the vehicle is displayed on the display unit by the display control unit. Thus, the deceleration state of the vehicle is expressed by using optical presentation moving from the upper side to the lower side along the vertical direction of the vehicle. Since such optical presentation gives others an image of energy conversion, a large majority of others can understand the deceleration state of the vehicle as compared with the country or area specific road signs or writing. Accordingly, the display control unit can provide smooth communication with others.

In one embodiment, the display control unit may display on the display unit the information including optical presentation, when speed of the vehicle is equal to a prescribed value or less. When communication between the vehicle and a pedestrian is taken into consideration, an opportunity to communicate increases as the speed of the vehicle and the pedestrian become closer. The display device can start and end communication with a pedestrian with appropriate timing by limiting a condition of displaying the optical presentation to the time when the speed of the vehicle is equal to a prescribed value or less.

A second aspect of the present disclosure is a display method for a display device. The display device is provided in a vehicle that travels autonomously and the display device includes a display unit that displays information to an outside of the vehicle. The method includes, determining whether a travel state of the vehicle is any one of a deceleration state, a stop state, and a start state, based on a detection result of an internal sensor of the vehicle; and displaying the information corresponding to each of the deceleration state, the stop state, and the start state, based on a determination result. In response to the determination that the vehicle is in the deceleration state, displaying on the display unit the information including a display moving from an upper side to a lower side along a vertical direction of the vehicle.

In the second aspect, the method may displaying on the display unit the information including the display, when speed of the vehicle is equal to a prescribed value or less.

According to various aspects and embodiments of the present disclosure, smooth communication with others can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 illustrates an example of display timing;

FIG. 5 is a table illustrating an example of the details of display aspects;

FIG. 10 is a flowchart showing an example of a notification process.

DETAILED DESCRIPTION OF EMBODIMENTS

Figure 1:
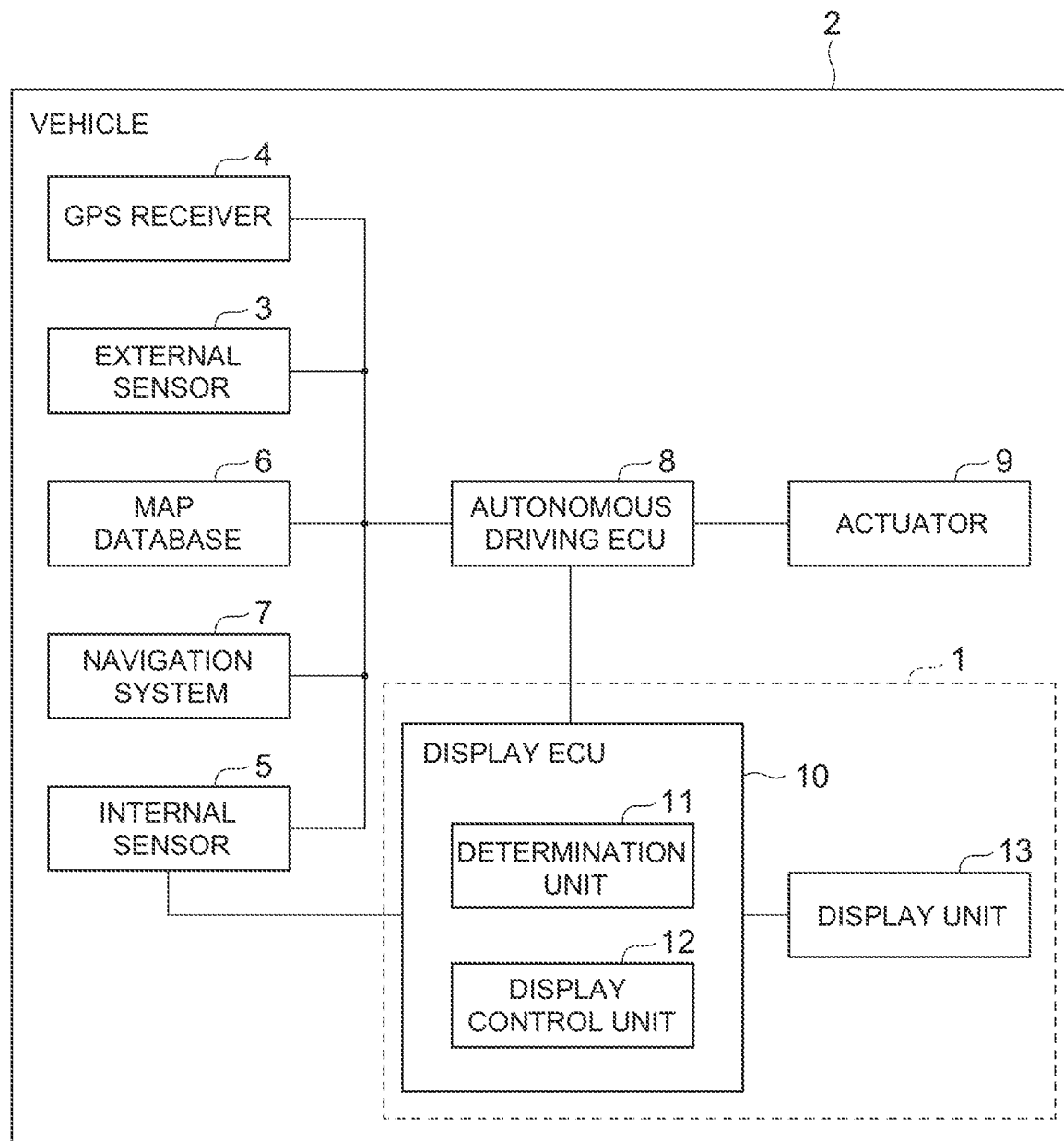
FIG. 1 is a functional block diagram of an example of a vehicle including a display device according to a first embodiment.

Hereinafter, exemplary embodiments will be described with reference to the drawings. In the following description, like or corresponding component members are designated by like reference numerals to omit redundant explanation.

First Embodiment

Configuration of Vehicle and Display Device

FIG. 1 is a functional block diagram of an example of a vehicle 2 including a display device 1 according to a first embodiment. As shown in FIG. 1, the display device 1 is mounted on the vehicle 2, such as a passenger car, to notify information to peripheral vehicles present around the vehicle 2. In one example, the vehicle 2 is a vehicle that travels autonomously. Autonomous driving is vehicle control for performing autonomous travel of the vehicle 2 toward a destination set in advance. The destination may be set by an occupant, such as a driver, or may automatically be set by the vehicle 2. In autonomous driving, the vehicle 2 travels autonomously without the necessity of the driver performing driving operation.

The vehicle 2 includes an external sensor 3, a GPS receiver 4, an internal sensor 5, a map database 6, a navigation system 7, an autonomous driving ECU 8, and an actuator 9.

The external sensor 3 is a detector that detects the situation around the vehicle 2. The external sensor 3 detects the position of an object ahead of a roadway on which the vehicle 2 travels. The external sensor 3 includes at least one of a camera and a radar sensor.

The camera is an imaging device that images an external situation of the vehicle 2. For example, the camera is provided on the back side of a windshield of the vehicle 2. The camera acquires imaging information regarding the external situation of the vehicle 2. The camera may be a monocular camera or may be a stereoscopic camera. The stereoscopic camera has two imaging units arranged to reproduce a binocular disparity. Imaging information of the stereoscopic camera includes depth-directional information.

The radar sensor is a detector that detects an object around the vehicle 2 with use of electric waves (such as millimeter waves) or light. Examples of the radar sensor include a millimeter-wave radar or a laser imaging detection and ranging (LIDAR). The radar sensor detects an object by transmitting an electric wave or light to the periphery of the vehicle 2 and receiving the electric wave or light reflected by the object.

The GPS receiver 4 receives signals from three or more GPS satellites to acquire location information indicating the location of the vehicle 2. For example, the location information includes latitude and longitude. The GPS receiver 4 may be replaced with other devices that can identify the latitude and longitude indicating where the vehicle 2 is present.

The internal sensor 5 is a detector that detects a travel state of the vehicle 2. The internal sensor 5 includes a vehicle speed sensor, an acceleration sensor, and a yaw rate sensor. The vehicle speed sensor is a detector that detects the speed of the vehicle 2. Used as the vehicle speed sensor is a wheel speed sensor provided in a wheel of the vehicle 2 or in a drive shaft that integrally rotates with the wheel, or the like, to detect rotation speed of the wheel.

The acceleration sensor is a detector that detects acceleration of the vehicle 2. The acceleration sensor may include a longitudinal acceleration sensor that detects acceleration in a longitudinal direction of the vehicle 2 and a lateral acceleration sensor that detects acceleration of the vehicle 2. The yaw rate sensor is a detector that detects a yaw rate (rotational angular speed) around a vertical axis of the center of gravity of the vehicle 2. As the yaw rate sensor, a gyro sensor may be used, for example.

The map database 6 is a storage device that stores map information. The map database 6 is stored in a hard disk drive (HDD) mounted in the vehicle 2, for example. The map database 6 includes information on static objects, traffic rules, and the positions of traffic signals, as map information. Examples of the static objects include road surface paints (including lane boundary lines, such as white lines and yellow lines) and structures (such as curbstones, poles, electric poles, buildings, indicators, and trees). Some of the map information included in the map database 6 may be stored in a storage device different from the HDD that stores the map database 6. Some or all of the map information included in the map database 6 may be stored in a storage device other than the storage device provided in the vehicle 2.

The navigation system 7 guides the driver of the vehicle 2 to the destination set in advance. The navigation system 7 recognizes travel roads and travel lanes for the vehicle 2 to travel, based on the location of the vehicle 2 measured by the GPS receiver 4 and on the map information in the map database 6. The navigation system 7 calculates a target route from the location of the vehicle 2 to the destination, and guides the driver along the target route with a human machine interface (HMI).

The actuator 9 is a device that executes travel control of the vehicle 2. The actuator 9 includes at least an engine actuator, a brake actuator, and a steering actuator. The engine actuator changes the amount of air supplied to the engine (for example, changes a throttle opening angle) in response to a control signal from the autonomous driving ECU 8 so as to control drive power of the vehicle 2. The engine actuator controls drive power of a motor as a driving power source, when the vehicle 2 is a hybrid vehicle or an electric vehicle.

The autonomous driving ECU 8 controls the vehicle 2. An ECU is an electronic control unit including a central processing unit (CPU), a read only memory (ROM), a random access memory (RAM), and a controller area network (CAN) communication circuit. For example, the autonomous driving ECU 8 is connected to a network that communicates with use of the CAN communication circuit, and is communicably connected with the above-described component members of the vehicle 2. For example, the autonomous driving ECU 8 implements autonomous driving functions by operating the CAN communication circuit to allow data input and output, storing the data in the RAM, loading the programs stored in the ROM to the RAM, and executing the programs loaded to the RAM, based on signals output from the CPU. The autonomous driving ECU 8 may be configured with a plurality of electronic control units.

In one example, the autonomous driving ECU 8 recognizes objects (including the position of the object) around the vehicle 2, based on at least one of the detection result of the external sensor 3 and the map database 6. The objects include unmovable static objects, such as electric poles, guardrails, trees, and buildings, as well as dynamic objects, such as pedestrians, bicycles, and other vehicles. For example, the autonomous driving ECU 8 performs object recognition whenever the autonomous driving ECU 8 acquires the detection result from the external sensor 3. The autonomous driving ECU 8 may recognize the objects by other well-known methods.

In one example, the autonomous driving ECU 8 detects dynamic objects, among the recognized objects, by using the information on the static objects included in the map database 6. The autonomous driving ECU 8 may detect the dynamic objects by other well-known methods.

The autonomous driving ECU 8 applies a filter such as a Kalman filter or a particle filter to the detected dynamic objects, and detects moving amounts of the dynamic objects at the time. The moving amount includes the moving directions and moving speeds of the dynamic objects. The moving amounts may include rotation speeds of the dynamic objects. The autonomous driving ECU 8 may estimate error of the moving amounts.

The autonomous driving ECU 8 recognizes the travel state of the vehicle 2, based on the detection result (for example, vehicle speed information of the vehicle speed sensor, acceleration information of the acceleration sensor, yaw rate information of the yaw rate sensor, etc.) of the internal sensor 5. For example, the travel state of the vehicle 2 includes the vehicle speed, the acceleration, and the yaw rate.

The autonomous driving ECU 8 recognizes the boundary lines of the lane in which the vehicle 2 travels, based on the detection result of the external sensor 3.

The autonomous driving ECU 8 generates a route of the vehicle 2, based on the detection result of the external sensor 3, the map database 6, the recognized location of the vehicle 2 on the map, the information on the recognized objects (including lane boundary lines), the recognized travel state of the vehicle 2, and the like. At the time, the autonomous driving ECU 8 generates the route of the vehicle 2 based on the assumption of the behaviors of the objects around the vehicle 2. Examples of the assumption of the behaviors of the objects may include an assumption that all the objects around the vehicle 2 are static objects, an assumption that the dynamic objects move independently, and an assumption that the dynamic objects move while interacting with at least one of other objects and the vehicle 2.

The autonomous driving ECU 8 generates a plurality of route candidates of the vehicle 2 by using a plurality of assumptions. The route candidates include at least one route for the vehicle 2 to travel while avoiding objects. The autonomous driving ECU 8 selects one route based on the reliability of each route candidate, or the like.

The autonomous driving ECU 8 generates a travel plan corresponding to the selected route. The autonomous driving ECU 8 generates the travel plan corresponding to the route of the vehicle 2, based on the detection result of the external sensor 3 and the map database 6. The autonomous driving ECU 8 generates the travel plan within a range that the vehicle speed does not exceed the speed limits of the travel lanes, by using the speed limits stored in the map database 6. The autonomous driving ECU 8 also generates the travel plan such that the vehicle 2 travels so as not to exceed prescribed upper speed limits.

The autonomous driving ECU 8 outputs the travel plan to be generated such that the route of the vehicle 2 has a plurality of pairs of two elements: a target position p in a coordinate system fixed to the vehicle 2 and a speed V in each of the target points, i.e., a plurality of configuration coordinates (p, V). Here, each target position p has at least the positions of an x-coordinate and a y-coordinate in the coordinate system fixed to the vehicle 2, or the information equivalent thereto. The travel plan is not particularly limited as long as the behavior of the vehicle 2 is defined. For example, the travel plan may include target time t instead of the speed V, or may additionally include the target time t and the direction of the vehicle 2 at the target time t. The travel plan may be data indicating transition of the vehicle speed, acceleration-deceleration speed, and steering torque of the vehicle 2 at the time when the vehicle 2 travels on the route. The travel plan may include a speed pattern, an acceleration-deceleration speed pattern, and a steering pattern of the vehicle 2.

The autonomous driving ECU 8 autonomously controls travel of the vehicle 2 based on the generated travel plan. The autonomous driving ECU 8 outputs control signals corresponding to the travel plan to the actuator 9. Accordingly, the autonomous driving ECU 8 controls the travel of the vehicle 2 such that the vehicle 2 travels autonomously along with the travel plan.

The display device 1 includes a display ECU 10 and a display unit 13. The display ECU 10 is an electronic control unit that controls display of information. The display ECU 10 may be configured with a plurality of ECUs, or may be included in the autonomous driving ECU 8. The display unit 13 is a device provided in the vehicle 2 to notify information to the outside of the vehicle. The display unit 13 is connected to the display ECU 10 to notify information based on the output signals of the display ECU 10.

The information notified by the display unit 13 is information to be notified to the pedestrians who are present around the vehicle 2 or the drivers of peripheral vehicles. In one example, the peripheral vehicles are vehicles present in the range that is recognizable by the external sensor 3 of the vehicle 2. The peripheral vehicles may be other than vehicles. For example, the peripheral vehicles may include mobile objects, such as motorcycles and bicycles. The information to be notified is the result obtained by using the internal sensor 5, such as speed information or acceleration information relating to the vehicle 2. The information to be notified may be the result obtained by using the external sensor 3, such as detection information or recognition information relating to the vehicle 2. Alternatively, the information may be the information obtained from the autonomous driving ECU 8, such as a present action or a future action of the vehicle 2. Although the information to be notified is the state of the vehicle obtained by using the internal sensor 5 in the following description, the information is not limited to this.

Figure 2A:
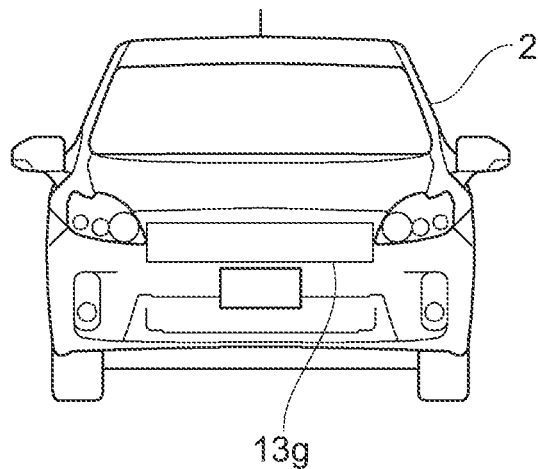
FIG. 2A shows an example of a position of mounting a display unit on the vehicle.
Figure 2B:
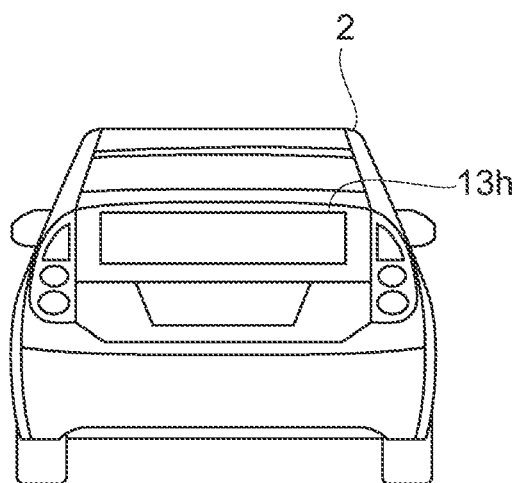
FIG. 2B shows an example of the position of mounting the display unit on the vehicle.
Figure 2C:
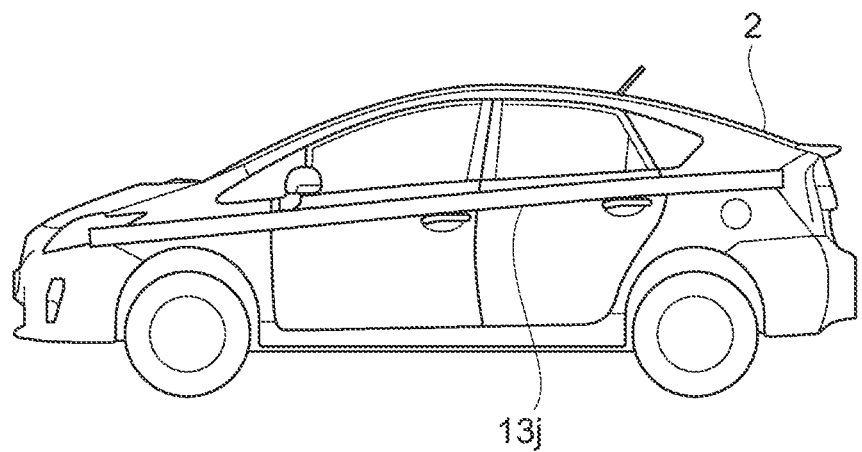
FIG. 2C shows an example of the position of mounting the display unit on the vehicle.

The display unit 13 is a display device in one example. The display unit 13 is disposed in a position that is visually recognizable from the front, rear or lateral sides of the vehicle 2. FIGS. 2A to 2C show examples of the position of the display unit 13 mounted on the vehicle. As shown in FIG. 2A, a front display device 13g is provided as the display unit 13 in a grill portion of the front surface of the vehicle 2. As shown in FIG. 2B, a rear display device 13h is provided as the display unit 13 on the rear surface of the vehicle 2. Furthermore, as shown in FIG. 2C, a side display device 13j is provided as the display unit 13 on a side surface of the vehicle 2. The display unit 13 is not limited to the examples shown in FIG. 2A to 2C. Two or more display units 13 may be provided in the grill portion of the front surface of the vehicle 2, or the display devices may be provided on the rear surface and side surface of the vehicle 2.

The display ECU 10 includes a determination unit 11, and a display control unit 12.

The determination unit 11 determines whether the travel state of the vehicle 2 is any one of a deceleration state, a stop state, and a start state, based on the detection result of the internal sensor 5 of the vehicle 2. The determination unit 11 determines the travel state of the vehicle 2 using a speed change or the absolute value of a speed predetermined for every travel state. For example, when the speed change has a tendency to decrease, the determination unit 11 determines that the travel state of the vehicle 2 is the deceleration state. For example, when the absolute value of the speed is close to zero and when there is no speed change, the determination unit 11 determines that the travel state of the vehicle 2 is the stop state. For example, when the absolute value of the speed is close to zero but the speed change has a tendency to increase, the determination unit 11 determines that the travel state of the vehicle 2 is the start state.

The display control unit 12 displays on the display unit 13 the information corresponding to each of the deceleration state, the stop state, and the start state based on the determination result of the determination unit 11. The information corresponding to the deceleration state, the information corresponding to the stop state, and the information corresponding to the start state are different from each other and set in advance. The details of the display will be described later.

Example of Display Timing

FIG. 3 illustrates an example of display timing. An example where the vehicle 2 gives way to a pedestrian H1 will be described with reference to FIG. 3. During traveling, the display control unit 12 turns off (OFF) the display unit 13 of the vehicle 2. As shown in FIG. 3, it is assumed that the autonomous driving ECU 8 recognizes the pedestrian H1 ahead of the vehicle 2 at time t1. The autonomous driving ECU 8 starts to decelerate the vehicle 2 at time t2 in order to give way to the pedestrian H1. At the time, the display control unit 12 changes a deceleration display from OFF to ON. Accordingly, the display unit 13 starts the deceleration display at time t2. The deceleration display is a display that indicates that the vehicle 2 is decelerating. Next, at time t3, the autonomous driving ECU 8 stops the vehicle 2 before the pedestrian H1. At the time, the display control unit 12 changes the deceleration display from ON to OFF, and changes a stop display from OFF to ON. Accordingly, at time t3, the display unit 13 ends the deceleration display and starts a stop display. The stop display is a display that indicates that the vehicle 2 is in a stopped state. Next, at time t4, the autonomous driving ECU 8 confirms that the pedestrian H1 has finished crossing, and starts the vehicle 2. At the time, the display control unit 12 changes the stop display from ON to OFF, and changes a start display from OFF to ON. Accordingly, at time t4, the display unit 13 ends the stop display and starts the start display. After the vehicle 2 is started, the display control unit 12 changes the start display from ON to OFF at the timing when the vehicle speed becomes a prescribed speed or more.

Operation of Display Device

Figure 4:
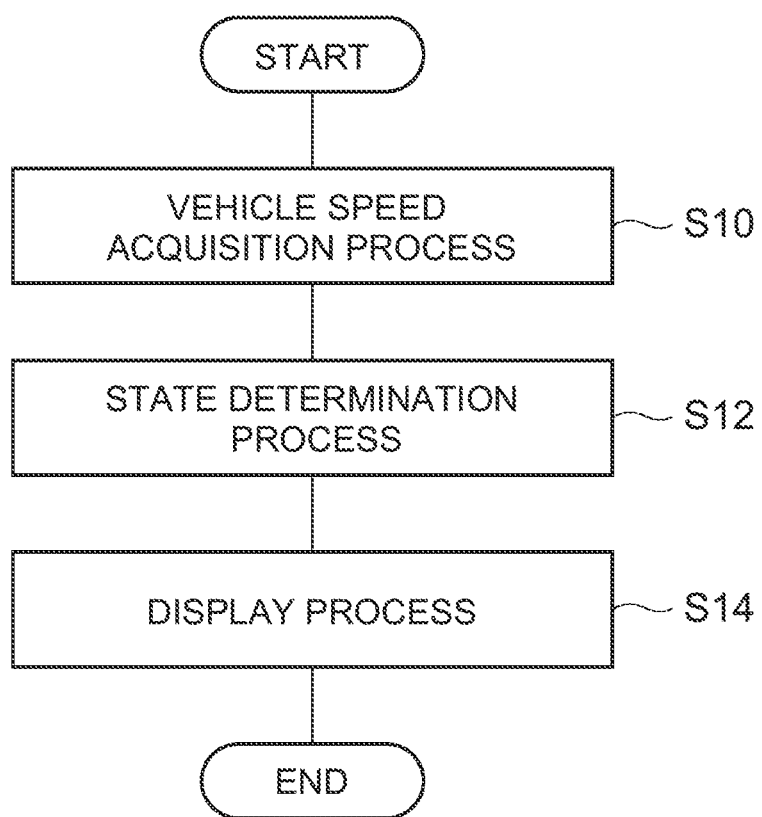
FIG. 4 is a flowchart showing an example of the operation of the display device.

FIG. 4 is a flowchart showing an example of the operation of the display device. The flowchart shown in FIG. 4 is executed by the display ECU 10 of the display device 1. The display ECU 10 starts the process when, for example, a display start button is turned on by operation of a driver.

As shown in FIG. 4, the determination unit 11 of the display ECU 10 acquires the speed of the vehicle 2 detected by the internal sensor 5 as a vehicle speed acquisition process (S10). Next, as a state determination process (S12), the determination unit 11 determines whether the travel state of the vehicle 2 is any one of the deceleration state, the stop state, and the start state, based on the speed obtained in the vehicle speed acquisition process (S10).

Next, as a display process (S14), the display control unit 12 of the display ECU 10 displays the information corresponding to each of the deceleration state, the stop state, and the start state on the display unit based on the determination result of the state determination process (S12). When the display process (S14) is ended, the flowchart shown in FIG. 4 is ended. After the flowchart is ended, the flowchart shown in FIG. 4 is conducted from the beginning until a display end condition is satisfied. The display end condition is satisfied when, for example, a display end button is turned on by operation of the driver.

Details of Display Aspects

The details of the display performed by the display unit 13 in the display process (S14) will be described with reference to FIGS. 5 to 7D. FIG. 5 is a table illustrating an example of the details of display aspects. FIGS. 6A to 6D illustrate examples of the deceleration display. FIGS. 7A to 7D are tables illustrating examples of the details of the display aspects.

As shown in FIG. 5, the travel states of the vehicle 2 and display expressions are associated in advance. The display control unit 12 controls display of the display unit 13 based on the correspondence shown in FIG. 5. The display control unit 12 provides an optical presentation using an optical graphic (hereinafter, also referred to as an object), for example. The optical presentation is to move the displayed optical graphic by changing light emission in time series.

The display control unit 12 changes vertical movement of the optical graphic, as vertical expression, in accordance with the travel state of the vehicle 2. For example, when the travel state of the vehicle 2 is the deceleration state, the display control unit 12 provides the optical presentation such that the object flows from an upper side to a lower side. For example, when the travel state of the vehicle 2 is the stop state, the display control unit 12 provides the optical presentation such that the optical graphic slowly moves up and down with stagnation (stagnation expression). For example, when the travel state of the vehicle 2 is the start state, the display control unit 12 provides the optical presentation such that the object flows from the lower side to the upper side.

Figure 6A:
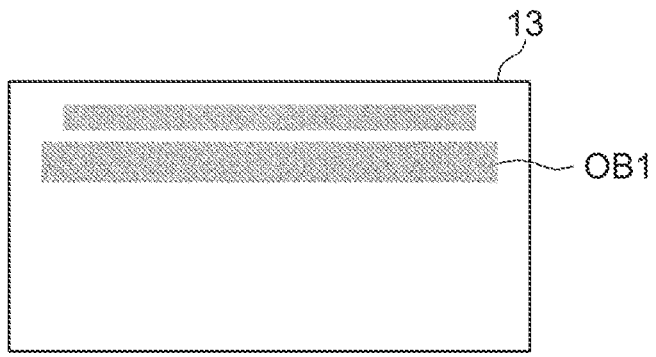
FIG. 6A illustrates an example of deceleration display.
Figure 6B:
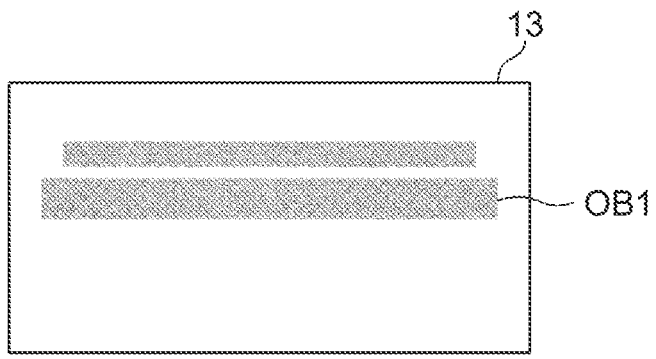
FIG. 6B illustrates an example of the deceleration display.
Figure 6C:
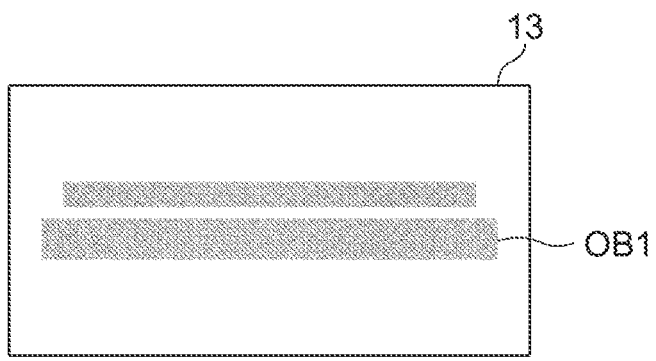
FIG. 6C illustrates an example of the deceleration display.
Figure 6D:
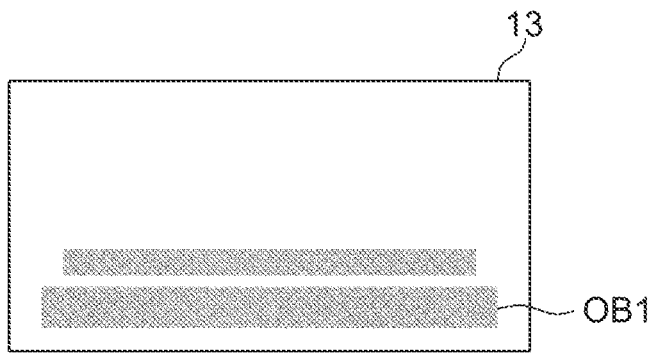
FIG. 6D illustrates an example of the deceleration display.

A detailed description is given of an example of the deceleration display in the vertical expression. FIGS. 6A to 6D are provided in a time series order. As shown in FIG. 6A, the display control unit 12 first displays an object OB1 that is an optical line on an upper portion of a display area of the display unit 13. Then, as shown in FIGS. 6B to 6D, the display control unit 12 shifts the object OB1 downward with a lapse of time. When the object OB1 passes a lower end of the display area of the display unit 13, the display control unit 12 displays a next object OB1 on the upper portion of the display area of the display unit 13. Accordingly, the optical presentation is provided such that the object OB1 continuously moves from the upper side to the lower side. The display control unit 12 may display the next object OB1 on the upper portion of the display area of the display unit 13, before the first object OB1 reaches the lower end of the display area of the display unit 13. In this case, the optical presentation is provided such that a plurality of objects OB1 flow from the upper side to the lower side. With the aspect of the object OB1 flowing from the upper side to the lower side, an image of energy convergence, i.e., deceleration, can be expressed.

Figure 7A:
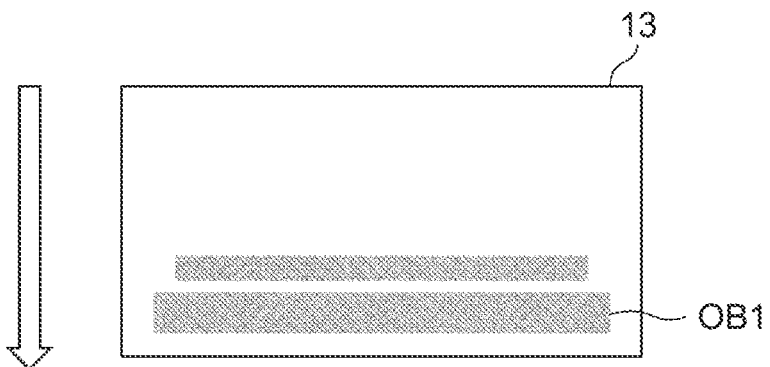
FIG. 7A is a table illustrating an example of the details of the display aspects.
Figure 7B:
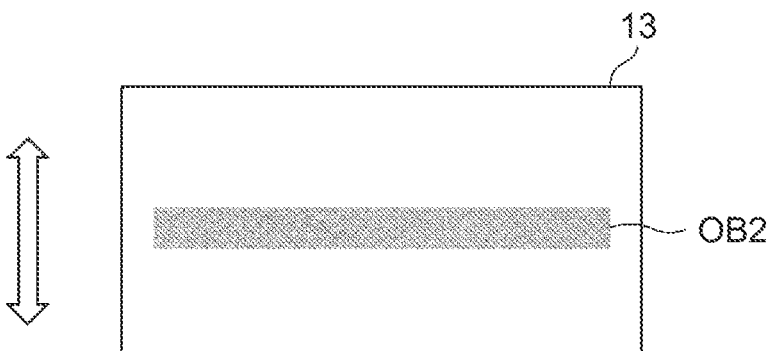
FIG. 7B is a table illustrating an example of the details of the display aspects.
Figure 7C:
FIG. 7C is a table illustrating an example of the details of the display aspects.

FIGS. 7A to 7C illustrate examples of deceleration display, stop display, and start display in the vertical expression, respectively. FIG. 7A is an example of the deceleration display in the vertical expression. As described above, the presentation of the object OB1 flowing from the upper side to the lower side is provided as shown by an arrow in the drawing. FIG. 7B is an example of the stop display in the vertical expression. An object OB2 shown in FIG. 7B slowly operates up and down in a low period in the vicinity of the center of the display area of the display unit 13 as shown by an arrow in the drawing. Such stagnation expression can express the stop of the vehicle 2. FIG. 7C is an example of the start display in the vertical expression. An object OB3 shown in FIG. 7C moves in the direction opposite to the object OB1, i.e., flows from the lower side to the upper side as shown by an arrow in the drawing. With the presentation of the object OB3 flowing from the lower side to the upper side, an image of energy divergence, i.e., start, can be expressed.

Figure 7D:
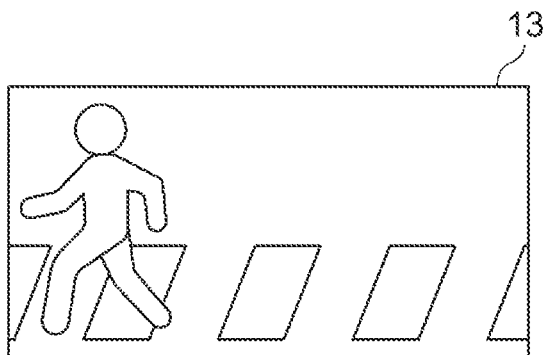
FIG. 7D is a table illustrating an example of the details of the display aspects.

The above-described optical presentations are merely examples, and the display unit 13 can display various graphics. For example, as the stop display, a pedestrian and a pedestrian crossing as shown in FIG. 7D can also be illustrated.

The display control unit 12 can also provide horizontal expression like the vertical expression described above. As the horizontal expression, the display control unit 12 changes a horizontal movement of an optical graphic in accordance with the travel state of the vehicle 2. For example, when the travel state of the vehicle 2 is the deceleration state, the display control unit 12 provides the optical presentation such that an object flows from outside to inside. This expresses an image of energy convergence, i.e., deceleration. For example, when the travel state of the vehicle 2 is the stop state, the display control unit 12 provides the optical presentation such that the optical graphic slowly moves in the horizontal direction with stagnation (stagnation expression). This expresses the stop of the vehicle. For example, when the travel state of the vehicle 2 is the start state, the display control unit 12 provides the optical presentation such that the object flows from the inside to the outside. This expresses an image of energy divergence, i.e., start.

The display control unit 12 can provide a front-rear expression like the vertical expression described before. As the front-rear expression, the display control unit 12 changes a front-rear movement of the optical graphic in accordance with the travel state of the vehicle 2. For example, when the travel state of the vehicle 2 is the deceleration state, the display control unit 12 provides the optical presentation such the object flows from the front side to the rear side. Accordingly, deceleration can be expressed by synchronizing the motion of the vehicle with the motion of light. For example, when the travel state of the vehicle 2 is the stop state, the display control unit 12 provides the optical presentation such that the optical graphic slowly moves in the front-rear direction with stagnation (stagnation expression). This expresses the stop of the vehicle. For example, when the travel state of the vehicle 2 is the start state, the display control unit 12 provides the optical presentation such that the object flows from the rear side to the front side. Accordingly, the start can be expressed by synchronizing the motion of the vehicle with the motion of light.

The display control unit 12 can change the area of the object as in the case of the vertical expression described above. As the area change, the display control unit 12 changes the area of the optical graphic in accordance with the travel state of the vehicle 2. For example, when the travel state of the vehicle 2 is the deceleration state, the display control unit 12 provides the optical presentation such that the area of the object becomes narrower (converging expression). This expresses an image of energy convergence, i.e., deceleration. For example, when the travel state of the vehicle 2 is the stop state, the display control unit 12 provides the optical presentation such that the area of the object becomes wider or narrower (stagnation expression). This expresses the stop of the vehicle. For example, when the travel state of the vehicle 2 is the start state, the display control unit 12 provides the optical presentation such that the area of the object becomes wider (diverging change). This expresses an image of energy divergence, i.e., start.

As other presentation effects, the display control unit 12 may change the color of the optical graphic in accordance with the travel state of the vehicle 2. For example, when the travel state of the vehicle 2 is the deceleration state, the display control unit 12 colors the object orange. This expresses that the vehicle 2 is coming closer, and others can be alerted. For example, when the travel state of the vehicle 2 is the stop state, the display control unit 12 colors the object green. This expresses the state where the vehicle 2 is stopped and stable to give the others a safe impression. For example, when the travel state of the vehicle 2 is the start state, the display control unit 12 colors the object white. This expresses that the vehicle 2 begins to move, and others can be alerted.

As other presentation effects, the display control unit 12 may change the speed of the motion of the optical graphic in accordance with the travel state of the vehicle 2. For example, when the travel state of the vehicle 2 is the deceleration state, the display control unit 12 flashes the object in a first period (long period). Such gradual flashing can express deceleration. For example, when the travel state of the vehicle 2 is the stop state, the display control unit 12 lights the object. This expresses that the vehicle is in a stopped state. For example, when the travel state of the vehicle 2 is the start state, the display control unit 12 flashes the object in a second period (short period) that is shorter than the first period. This expresses the start state of the vehicle with a slight alertness.

As other presentation effects, the display control unit 12 may change the tone of light in accordance with the travel state of the vehicle 2. The display control unit 12 sets the luminance to three levels including large, middle, and small. For example, when the travel state of the vehicle 2 is the deceleration state, the display control unit 12 may set the luminance of the object to middle. Thus, the luminance at the middle level can express gradual deceleration. For example, when the travel state of the vehicle 2 is the stop state, the display control unit 12 sets the luminance of the object to small. This expresses that the vehicle is in the stopped state. For example, when the travel state of the vehicle 2 is the start state, the display control unit 12 sets the luminance of the object to large. This expresses the start state of the vehicle with a slight alertness.

Summary of First Embodiment

In the display device 1 according to the first embodiment, whether the travel state of the vehicle 2 is in any one of a deceleration state, a stop state, and a start state is determined by the determination unit 11. Based on the determination result of the determination unit 11, the information corresponding to each of the deceleration state, the stop state, and the start state is displayed on the display unit 13 by the display control unit 12. Thus, the display device 1 can display the state of the vehicle 2 to the outside of the vehicle. Then, in response to the determination unit 11 having determined that the vehicle 2 is in the deceleration state, the information including optical presentation moving from an upper side to a lower side along a vertical direction of the vehicle 2 is displayed on the display unit 13 by the display control unit 12. Thus, the deceleration state of the vehicle 2 is expressed by optical presentation moving from the upper side to the lower side along the vertical direction of the vehicle 2. Since such optical presentation gives others an image of energy conversion, a large majority of others can understand the deceleration state of the vehicle as compared with the country or area specific road signs or writing. Accordingly, the display control unit can provide smooth communication with others. Moreover, optical presentation is not limited by the shape or size of the display area of the display unit 13. Accordingly, the display device 1 can provide notification that is not limited by the shape or size of the display area of the display unit 13.

Second Embodiment

A display device 1A according to the second embodiment is similar to the display device 1 according to the first embodiment except for the point that the display ECU in the second embodiment includes a notification determination unit 111 and the point that the function of the display control unit 12 is partially different. Hereinafter, description is mainly given of the difference from the first embodiment, and the description of the similar parts is not redundantly provided.

Configuration of Vehicle and Display Device

Figure 8:
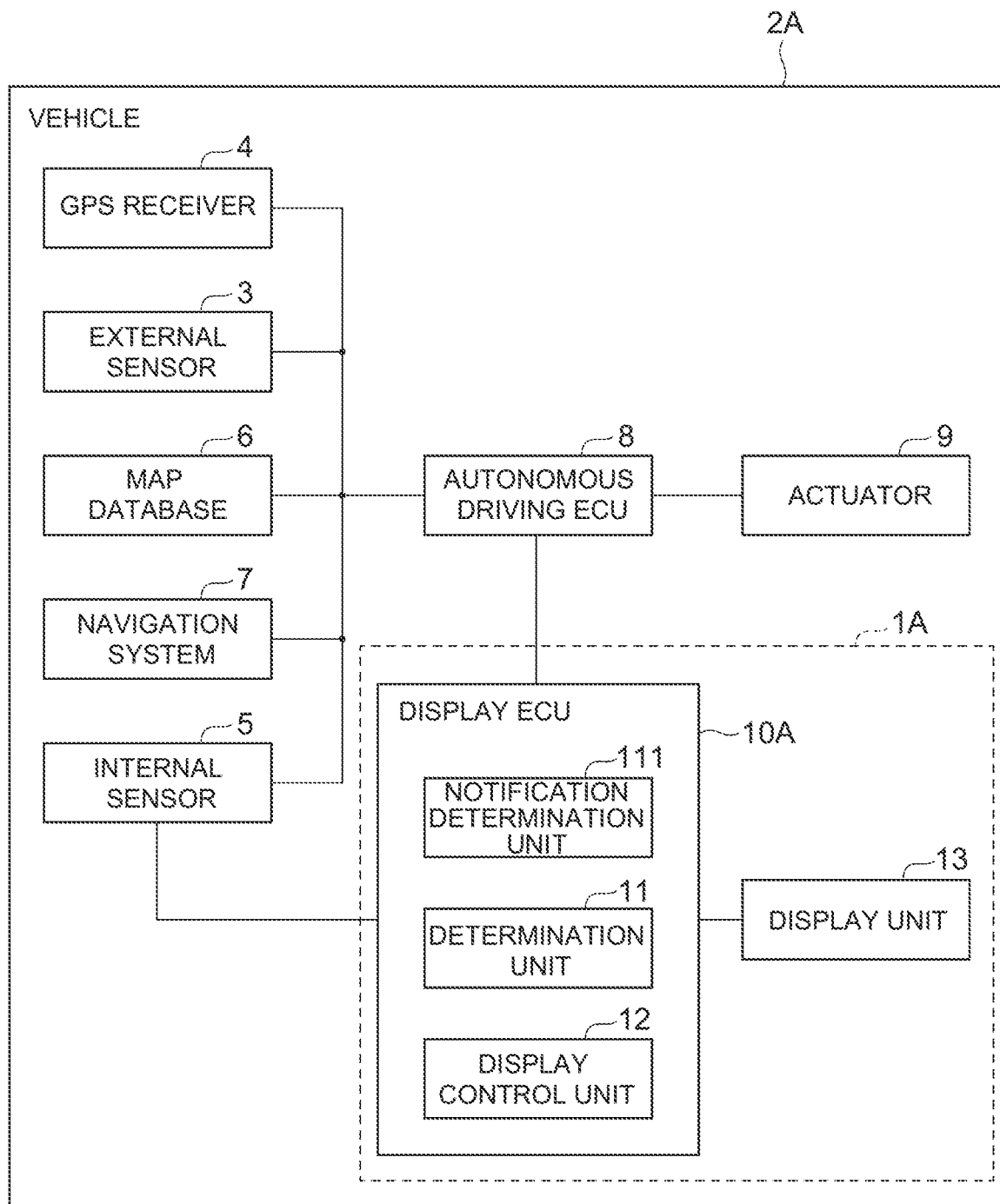
FIG. 8 is a functional block diagram of an example of the vehicle including a display device according to a second embodiment.

FIG. 8 is a functional block diagram of an example of the vehicle including a display device according to the second embodiment. A vehicle 2A is similar to the vehicle 2 except for the point that a display device 1A is included. The display device 1A includes a display ECU 10A and a display unit 13. The display ECU 10A includes a notification determination unit 111, a determination unit 11, and a display control unit 12. The notification determination unit 111 determines whether or not a notification target candidate is present in the periphery of the vehicle 2A. The notification determination unit 111 acquires recognition information regarding the objects around the vehicle 2A (pedestrians, bicycles, other vehicles, etc.) from an autonomous driving ECU 8. The recognition information includes a type, a position, a speed, a moving direction, face orientation, or the like, of the objects. When the recognition information regarding the objects is acquired, the notification determination unit 111 determines that the notification target candidate is present. When the recognition information regarding the objects is not acquired, the notification determination unit 111 determines that the notification target candidate is not present. When the notification target candidate is present, the notification determination unit 111 determines whether or not there is an opportunity of communication with the notification target candidate, based on the recognition information regarding the objects. As an example of the opportunity of communication, an aid for crossing a road for a pedestrian will be described. When a scheduled route of the notification target candidate intersects a scheduled route of the vehicle 2A, the notification determination unit 111 determines that there is an opportunity of communication. The scheduled route of the notification target candidate is determined based on a current moving direction, face orientation, the presence or absence of a pedestrian crossing, and the like. When the scheduled route of the notification target candidate does not cross the scheduled route of the vehicle 2A, the notification determination unit 111 determines that there is no opportunity of communication. The notification determination unit 111 sets the notification target candidate, determined to have an opportunity of communication, as a notification target. The notification determination unit 111 may perform the process by using the result of the external sensor 3, without using the recognition result of the autonomous driving ECU 8.

The display control unit 12 determines whether or not the speed of the vehicle 2A is equal to a prescribed value or less, based on the detection result of the internal sensor 5. The prescribed value is a preset speed that is a threshold for determining the necessity of notification. The prescribed value is 40 km/h in one example. When the speed of the vehicle 2A is equal to the prescribed value or less, the display control unit 12 controls the display unit 13. The display unit 13 displays to the outside of the vehicle. The display control unit 12 does not control the display unit 13, when the speed of the vehicle 2A exceeds the prescribed value. The display unit 13 does not display to the outside of the vehicle.

The display control unit 12 controls the display unit 13, when the notification determination unit 111 determines that there is a notification candidate. The display unit 13 displays to the outside the vehicle. The display control unit 12 does not control the display unit 13, when the notification determination unit 111 determines that there is no notification candidate. The display unit 13 does not display to the outside of the vehicle. Other configurational aspects of the display device 1A are similar to those of the display device 1.

Operation of Display Device

Figure 9:
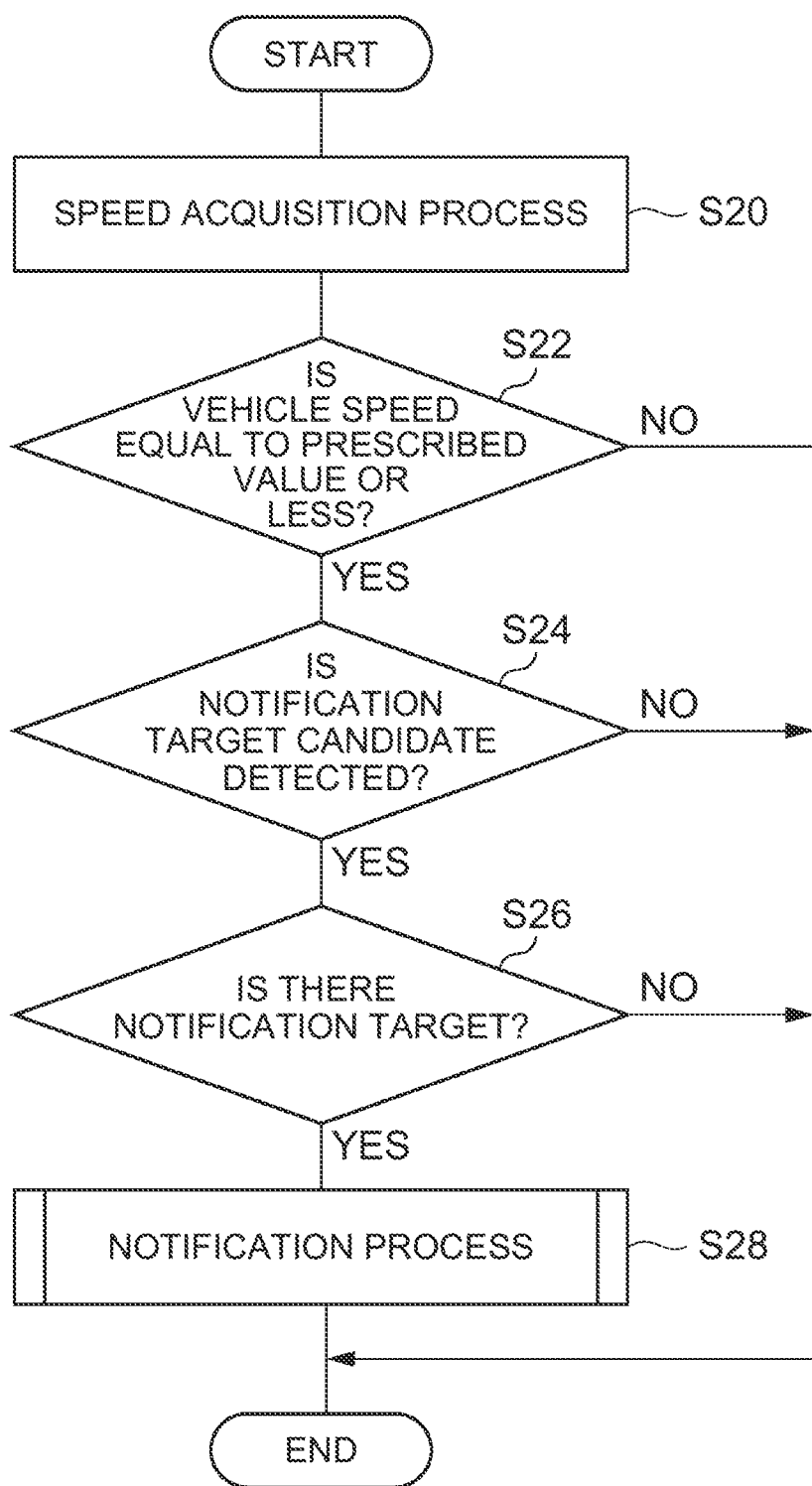
FIG. 9 is a flowchart showing an example of the operation of the display device.

FIG. 9 is a flowchart showing an example of the operation of the display device. The flowchart shown in FIG. 9 is executed by the display ECU 10A of the display device 1A. The display ECU 10A starts the process when, for example, a display start button is turned on by operation of a driver.

As shown in FIG. 9, the determination unit 11 of the display ECU 10A acquires the speed of the vehicle 2A detected by the internal sensor 5 as a vehicle speed acquisition process (S20). Next, as a vehicle speed determination process (S22), the display control unit 12 of the display ECU 10A determines whether or not the speed of the vehicle 2A acquired in the vehicle speed acquisition process (S20) is equal to a prescribed value or less.

When the display control unit 12 determines that the speed of the vehicle 2A is equal to the prescribed value or less (S22: YES), the notification determination unit 111 of the display ECU 10A determines whether or not a notification target candidate is detected as a candidate determination process (S24). When the result of recognizing an object by the autonomous driving ECU 8 is acquired, the notification determination unit 111 determines that there is a notification target candidate. When the result of recognizing an object by the autonomous driving ECU 8 is not acquired, the notification determination unit 111 determines that there is no notification target candidate.

When determining that notification target candidate is detected (S24: YES), the notification determination unit 111 determines, as a target determination process (S26), whether there is an opportunity of communication with the notification target candidate based on the recognition information regarding the notification target candidate. The notification determination unit 111 determines the notification target candidate with the opportunity of communication as a notification target. The notification determination unit 111 determines the notification target candidate without the opportunity of communication as a non-notification target.

When the notification determination unit 111 determines that there is a notification target (S26: YES), the display control unit 12 of the display ECU 10A displays the information on the display unit 13 as a notification process (S28). The details of the notification process (S28) will be described later.

When the notification process (S28) is ended, the flowchart shown in FIG. 9 is ended. When the notification determination unit 111 determines that the speed of the vehicle 2A is not equal to the prescribed value or less (S22: NO), when the notification determination unit 111 determines that the notification target candidate is not detected (S24: NO), and when the notification determination unit 111 determines that there is no notification target (S26: NO), the flowchart shown in FIG. 9 is ended without execution of the notification. After the flowchart is ended, the flowchart shown in FIG. 9 is conducted from the beginning until a notification end condition is satisfied. The notification end condition is satisfied when, for example, a display end button is turned on by operation of the driver.

Details of Notification Process

FIG. 10 is a flowchart showing an example of the notification process. The flowchart shown in FIG. 10 shows the detail of the notification process (S28) of FIG. 9.

First, the determination unit 11 of the display ECU 10A determines whether the vehicle 2A is starting as a travel state determination process (S30). The determination unit 11 determines whether or not the vehicle 2A is starting based on the speed obtained in the vehicle speed acquisition process (S20). When the determination unit 11 determines that the vehicle 2A is starting (S30: YES), the display control unit 12 displays a start display on the display unit 13 as a start display process (S32).

The determination unit 11 may determine whether the vehicle 2A is scheduled to start as the travel state determination process (S30). The determination unit 11 may determine that the vehicle 2A is scheduled to start, when receiving a signal indicating that the vehicle 2A is scheduled to start after a prescribed time from the autonomous driving ECU 8. When the determination unit 11 determines that the vehicle 2A is scheduled to start, the display control unit 12 may execute the start display process (S32).

When the determination unit 11 determines that the vehicle 2A is not starting (S30: NO), the display control unit 12 determines whether or not the vehicle 2A is decelerating as a travel state determination process (S34). The determination unit 11 determines whether or not the vehicle 2A is decelerating based on the speed obtained in the vehicle speed acquisition process (S20). When the display control unit 12 determines that the vehicle 2A is decelerating (S34: YES), the display control unit 12 displays a deceleration display on the display unit 13 as a deceleration display process (S36).

When the determination unit 11 determines that the vehicle 2A is not decelerating (S34: NO), the display control unit 12 determines whether or not the vehicle 2A is in a stopped state as a travel state determination process (S38). The determination unit 11 determines whether or not the vehicle 2A is in the stopped state based on the speed obtained in the vehicle speed acquisition process (S20). When the display control unit 12 determines that the vehicle 2A is in the stopped state (S38: YES), the display control unit 12 displays a stop display on the display unit 13 as a stop display process (S40).

When the display control unit 12 performs the start display process (S32), the deceleration display process (S36), and the stop display process (S40), and when the display control unit 12 determines that the vehicle 2A is not in the stopped state (S38: NO), the flowchart shown in FIG. 10 is ended. After the flowchart is ended, the process returns to the notification process (S28) of FIG. 9.

Summary of Second Embodiment

The display device 1A according to the second embodiment demonstrates the same effects as the display device 1 according to the first embodiment. Furthermore, since the display device 1A performs notification when the speed of the vehicle 2A is equal to the prescribed value or less, it is possible to start and end communication with a pedestrian with appropriate timing.

Although various exemplary embodiments have been described in the foregoing, the present disclosure may be subject to various omission, replacement, and modification, without being limited to the exemplary embodiments.

For example, the display unit 13 does not need to be provided outside the vehicle 2. As long as information can be notified to the outside of the vehicle, the display unit 13 may be provided inside the vehicle, such as inside the windshield glass. Without being limited to the display device, the display unit 13 may be any light emitting devices, such as a lamp. The display device 1 may further display deceleration, stop, and start in writing when a display device is adopted as the display unit 13. The display unit 13 may be a projector that projects optical presentation on a road surface.

Since some functions of the display devices 1, 1A are overlapped with the functions of the autonomous driving ECU 8, the display ECU 10 may be configured to acquire the result of calculation performed by the autonomous driving ECU 8.

The vehicle speed determination process (S22) of FIG. 9 may be executed any time, as long as after the start of the process of FIG. 9 and before the notification process (S28).

What is claimed is:

1. A display device provided in a vehicle that travels autonomously, comprising:
a display unit configured to display information to an outside of the vehicle;
a determination unit configured to determine whether a travel state of the vehicle is a deceleration state; and a display control unit configured to display on the display unit the information corresponding to the deceleration state based on a determination result of the determination unit, in response to the determination unit having determined that the vehicle is in the deceleration state, the display control unit is configured to display on the display unit the information including a display moving from an outside to an inside of the display unit.

2. The display device of claim 1, wherein the display control unit displays on the display unit the information including the display, when a speed of the vehicle is equal to a prescribed value or less.

3. A display method for a display device, the display device being provided in a vehicle that travels autonomously and the display device including a display unit that displays information to an outside of the vehicle; the method comprising:

determining whether a travel state of the vehicle is a deceleration state; and displaying the information corresponding to the deceleration state in response to the determination that the vehicle is in the deceleration state, the information including a display moving from an outside to an inside of the display unit.

4. The method according to claim 3, wherein displaying on the display unit the information including the display, when speed of the vehicle is equal to a prescribed value or less.

* * * * *